United States Patent
Gupta et al.

(10) Patent No.: US 11,645,541 B2
(45) Date of Patent: May 9, 2023

(54) MACHINE LEARNING MODEL INTERPRETATION

(71) Applicant: Adobe Inc., San Jose, CA (US)

(72) Inventors: Piyush Gupta, Noida (IN); Nikaash Puri, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 1097 days.

(21) Appl. No.: 15/815,899

(22) Filed: Nov. 17, 2017

(65) Prior Publication Data
US 2019/0156216 A1 May 23, 2019

(51) Int. Cl.
*G06N 3/086* (2023.01)
*G06N 20/00* (2019.01)
*G06F 16/35* (2019.01)
*G06N 3/126* (2023.01)
*G06N 3/08* (2023.01)
*G06N 5/045* (2023.01)
*G06N 5/025* (2023.01)
(Continued)

(52) U.S. Cl.
CPC ........... *G06N 3/086* (2013.01); *G06F 16/353* (2019.01); *G06N 3/08* (2013.01); *G06N 3/126* (2013.01); *G06N 5/045* (2013.01); *G06N 20/00* (2019.01); *G06N 5/01* (2023.01); *G06N 5/025* (2013.01); *G06N 20/20* (2019.01)

(58) Field of Classification Search
CPC ........ G06N 3/086; G06N 20/00; G06N 20/10; G06N 20/20; G06N 3/08; G06N 3/126; G06N 5/045; G06N 5/003; G06N 5/025; G06F 16/353
See application file for complete search history.

(56) References Cited

U.S. PATENT DOCUMENTS 10,824,959 B1 * 11/2020 Chatterjee ................ G06N 3/08
2006/0059112 A1 * 3/2006 Cheng .................. G06K 9/6296
706/12
(Continued)

OTHER PUBLICATIONS

Puri et al., MAGIX: Model Agnostic Globally Interpretable Explanations, published Jun. 22, 2017, arXiv:1706.07160v1, 33 pages (Year: 2017).*

(Continued)

*Primary Examiner* — Li B. Zhen
*Assistant Examiner* — William Wai Yin Kwan
(74) *Attorney, Agent, or Firm* — Finch & Maloney PLLC

(57) ABSTRACT

A technique is disclosed for generating class level rules that globally explain the behavior of a machine learning model, such as a model that has been used to solve a classification problem. Each class level rule represents a logical conditional statement that, when the statement holds true for one or more instances of a particular class, predicts that the respective instances are members of the particular class. Collectively, these rules represent the pattern followed by the machine learning model. The techniques are model agnostic, and explain model behavior in a relatively easy to understand manner by outputting a set of logical rules that can be readily parsed. Although the techniques can be applied to any number of applications, in some embodiments, the techniques are suitable for interpreting models that perform the task of classification. Other machine learning model applications can equally benefit.

20 Claims, 9 Drawing Sheets

(51) Int. Cl.
G06N 5/01 (2023.01)
G06N 20/20 (2019.01)

(56) References Cited

U.S. PATENT DOCUMENTS

2012/0089620 A1* 4/2012 Castellanos ........... G06F 40/295
707/749
2017/0293849 A1* 10/2017 Hodjat ................... G06N 5/025

OTHER PUBLICATIONS

Fidelis et al., Discovering Comprehensible Classification Rules with a Genetic Algorithm, Proceedings of the 2000 Congress on Evolutionary Computation CEC00 (Cat.No.00TH8512), IEEE, Jul. 16-19, 2000, pp. 805-810 (Year: 2000).*

Sepahvand et al., Generating Graphical Chain by Mutual Matching of Bayesian Network and Extracted Rules of Bayesian Network Using Genetic Algorithm, arXiv:1412.4465v1, Dec. 15, 2014, 6 pages (Year: 2014).*

Kapila et al., A Genetic Algorithm with Entropy Based Initial Bias for Automated Rule Mining, Int'l Conf. on Computers & Communication Technology (ICCCT '10), IEEE 2010, pp. 491-495 (Year: 2010).*

Rivera, Wilson, Scalable Parallel Genetic Algorithms, Artificial Intelligence Review 16, Kluwer Academic Publishers, 2001, pp. 153-168 (Year: 2001).*

Huang et al., A hybrid genetic algorithm for feature selection wrapper based on mutual information, Pattern Recognition Letters 28 (2007), 2007 Elsevier B.V., Jun. 3, 2007, pp. 1825-1844 (Year: 2007).*

Huang et al., A hybrid genetic algorithm for feature selection wrapper based on mutual information, Pattern Recognition Letters 28 (2007), Jun. 3, 2007, 2007 Elsevier B.V., pp. 1825-1844 (Year: 2007).*

R.A. Fisher, "The Use of Multiple Measurements In Taxonomic Problems", Annals of Eugenics, 1936, pp. 179-188, v. 7.

Soumadip Ghosh et al., "Mining Frequent Itemsets Using Genetic Algorithm", International Journal of Artificial Intelligence & Applications, Oct. 2010, pp. 133-143, vol. 1, No. 4.

Benjamin Letham et al., "Interpretable Classifiers Using Rules and Bayesian Analysis: Building a Better Stroke Prediction Model", The Annals of Applied Statistics, 2015, pp. 1350-1371, vol. 9, No. 3.

Marco Tulio Ribeiro et al., "Why Should I Trust You? Explaining the Predictions of Any Classifier", KDD, 2016, 10 pgs.

Scott M. Lundberg et al., "An Unexpected Unity Among Methods For Interpreting Model Predictions", 29th Conference on Neural Information Processing Systems, 2016, 6 pages.

M.V. Fidelis et al., "Discovering Comprehensible Classification Rules with a Genetic Algorithm", Evolutionary Computation, 2000, 7 pgs.

R. Dennis Cook et al. "Residuals and Influence in Regression", Chapman and Hall, 1982, 240 pages.

Trevor Hastie et al., "Generalized Additive Models", Statistical Science, 1986, pp. 297-318, vol. 1, No. 3.

Patrick Hall et al., "Ideas on Interpreting Machine Learning", O'Reilly Media, Mar. 15, 2017, 82 pages.

Himabindu Lakkaraju et al., "Interpretable Decision Sets: A Joint Framework for Description and Prediction", KDD, Aug. 2016, 29 pages.

* cited by examiner

| Symbol | Definition | Example |
|---|---|---|
| $X$ | training data, consisting of instances | [(1, John, 25), (2, Jane, 30)...] |
| $Y$ | set of predicted classes | [approve, reject] |
| $x$ | Particular instance in the training set | (1, John, 25) |
| $y$ | Particular predicted class | approve |
| $c_i$ | Condition, which is a combination of an attribute and a range of values the attribute can take | age<30, state==New York |
| $R_i$ | A classification rule which classifies an instance to belong to its associated class if a predicate consisting of a conjunction(AND) of conditions holds. | IF age<30 and Income>100 and state==New York Then Predict Class approve |
| $C_i$ | Set of conditions for rule $R_i$ | IF age<30 and Income>100 |
| $y_i$ | Associated target class for rule $R_i$ | Predict Class: approve |
| cover($R_i$) | Set of instances rule $R_i$ covers in the training data. These are instances for which the conditions of $R_i$ are true. | $\{x_1, x_2\}$ |
| correct-cover($R_i$) | Set of instances for which the rule made a correct prediction. Formally, it is the set of instances $x_j$ such that $x_j$ is in cover($R_i$) and the predicted label of the rule $y_i$ matches with the class prediction by the classifier for the instance $x_j$ | $\{x_1\}$ |
| incorrect-cover($R_i$) | Set of instances that are incorrectly covered by $R_i$ | $\{x_2\}$ |
| $R$ | Rule set. Consists of a set of rules of the form $R_i$. | $\{R_1, R_2, ...\}$ |
| correct-cover($R$) | Correct cover of rule set $R$. Not to be confused with correct cover of rule $R_i$. It is defined as the union of the correct covers of $R_i$ for each rule in $R$ | $\{x_1, x_3\}$ |
| cover($R$) | Cover of rule set $R$. Not to be confused with cover of rule $R_i$. It is defined as the union of the covers of $R_i$ for each rule in $R$ | $\{x_1, x_2, x_3, x_4\}$ |

FIG. 4

Algorithm 1 EXPLAIN-MODEL

1: $X \leftarrow$ training instances
2: $M \leftarrow$ classification model
3: $Y \leftarrow$ set of output classes
4: $R \leftarrow$ Map<string, set()>
5: $PreProcessInputData(X, Y)$
6: for $y_i$ in $Y$ do
7:     conditions $\leftarrow GenerateInstanceLevelConditions(X, M, y_i)$
8:     classLevelRules $\leftarrow LearnClassLevelRules(X, M, conditions, y_i)$
9:     classLevelRules $\leftarrow PostProcessRules(classLevelRules, y_i)$
10:    optimalRuleSubset $\leftarrow ExtractOptimalRuleSubset(classLevelRules, y_i)$
11:    $R[C_i] \leftarrow FScoreSorting(optimalRuleSubset, y_i)$
12: end for
13: return $R$

FIG. 5

Algorithm 2 GENERATE-INSTANCE-LEVEL-CONDITIONS

1: $X \leftarrow$ training instances
2: $M \leftarrow$ classification model
3: not-yet-covered $\leftarrow X$
4: conditions $\leftarrow$ set()
5: for $x_i$ in $X$ do
6:     instance-level-conditions $\leftarrow$ *ComputeMarginalContributions($x_i$, M)*
7:     for *cond* in instance-level-conditions do
8:         not-yet-covered $\leftarrow$ not-yet-covered $-$ *CoveredInstances(cond)*
9:     end for
10:    conditions $\leftarrow$ conditions $\cup$ instance-level-conditions
11:    if *length*(not-yet-covered) $= 0$ then
12:        break;
13:    end if
14: end for
15: return conditions;

FIG. 6

Algorithm 3 GREEDY-SELECT-RULES

1: $R \leftarrow$ set of rules partitioned by class
2: $C \leftarrow$ set of classes
3: $Thr \leftarrow$ required coverage threshold
4: answer $\leftarrow$ empty set
5: for $C_i$ in $C$ do
6:     class-level-rules $\leftarrow$ *getRulesForClass(R, $C_i$)*
7:     sort class-level-rules in descending order of precision
8:     for $R_i$ in class-level-rules do
9:         if *class-coverage*(answer) $>$ Thr then
10:             break;
11:         end if
12:         answer $\leftarrow$ answer $\cup$ $R_i$
13:     end for
14: end for

FIG. 7

Algorithm 4 DP-SELECT-RULES

1: $R \leftarrow$ set of rules partitioned by class
2: $C \leftarrow$ set of classes
3: finalAnswer $\leftarrow$ Map<string, set()>
4: for $C_k$ in C do
5:     class-level-rules $\leftarrow$ *getRulesForClass(R, $C_k$)*
6:     answer $\leftarrow$ Map<(Int, Int), set()>
7:     for $R_i$ in class-level-rules do
8:         for len in 1 to i do
9:             if *F1-Score*(answer[(i-1, len)]) >= *F1-Score*(answer[(i-1, len-1)] ∪ $R_i$) then
10:                 answer[(i, len)] $\leftarrow$ answer[(i-1, len)]
11:             else
12:                 answer[(i, len)] $\leftarrow$ answer[(i-1, len-1)] ∪ $R_i$
13:             end if
14:         end for
15:     end for
16:     f-Final $\leftarrow$ 0
17:     lastRow $\leftarrow$ *length*(R)
18:     for len in 1 to lastRow do
19:         if *F1-Score*(answer[(lastRow, len)]) > f-Final then
20:             finalAnswer[$C_k$] $\leftarrow$ answer[(lastRow, len)]
21:             f-Final $\leftarrow$ *F1-Score*(answer[(lastRow, len)])
22:         end if
23:     end for
24: end for
25: return finalAnswer

FIG. 8

MACHINE LEARNING MODEL INTERPRETATION

FIELD OF THE DISCLOSURE

This disclosure relates generally to machine learning techniques, and more particularly, to techniques for interpreting a machine learning model.

BACKGROUND

Machine learning refers to techniques for automatically generating computer-executable instructions (learning) without explicit programming. Machine learning is a process of generating a model that describes the relationships between a set of known inputs and outputs. The machine learning model is used to predict the output for a given input. The model is essentially a black box, meaning that the transfer characteristics (or behavior) of the model cannot be definitively interpreted into an inclusive set of rules that describe all of the transfer characteristics. This is especially true of more complex models such as neural networks, random forests, gradient boosted trees, etc. Simpler models such as linear regression, logistic regression or decision trees gain interpretability at the cost of model accuracy. Hence, there is a tradeoff between model accuracy and interpretability. In more detail, to some extent, a computer scientist can evaluate the accuracy of a relatively simple machine learning model by applying test data to the model and comparing the output to an expected result. However, more complex models are difficult to validate with a high degree of confidence using test data alone, since it may not be possible or practicable to analyze every possible input sequence. As such, model interpretation remains an important part of the validation process. Moreover, interpreting the behavior of a black box machine learning model is useful for understanding how the model behaves globally. Such an understanding would provide insight into both the data on which the black box machine learning model was trained and the generalization power of the rules the model has learned. Thus, there is a need for improved techniques for interpreting machine learning models.

BRIEF DESCRIPTION OF THE DRAWINGS

The accompanying drawings are not intended to be drawn to scale. In the drawings, each identical or nearly identical component that is illustrated in various figures is represented by a like numeral.

FIG. 4 is an example table providing descriptions and examples of certain terms used in this disclosure.

FIG. 5 shows an example algorithm for interpreting a machine learning model, in accordance with an embodiment of the present disclosure.

FIG. 6 shows an example algorithm for generating instance level conditions, in accordance with an embodiment of the present disclosure.

FIG. 7 shows an example algorithm for selecting a subset of rules using a greedy approach, in accordance with an embodiment of the present disclosure.

FIG. 8 shows an example algorithm for selecting a subset of rules using a dynamic programming based approach, in accordance with an embodiment of the present disclosure.

DETAILED DESCRIPTION

Figure 1:
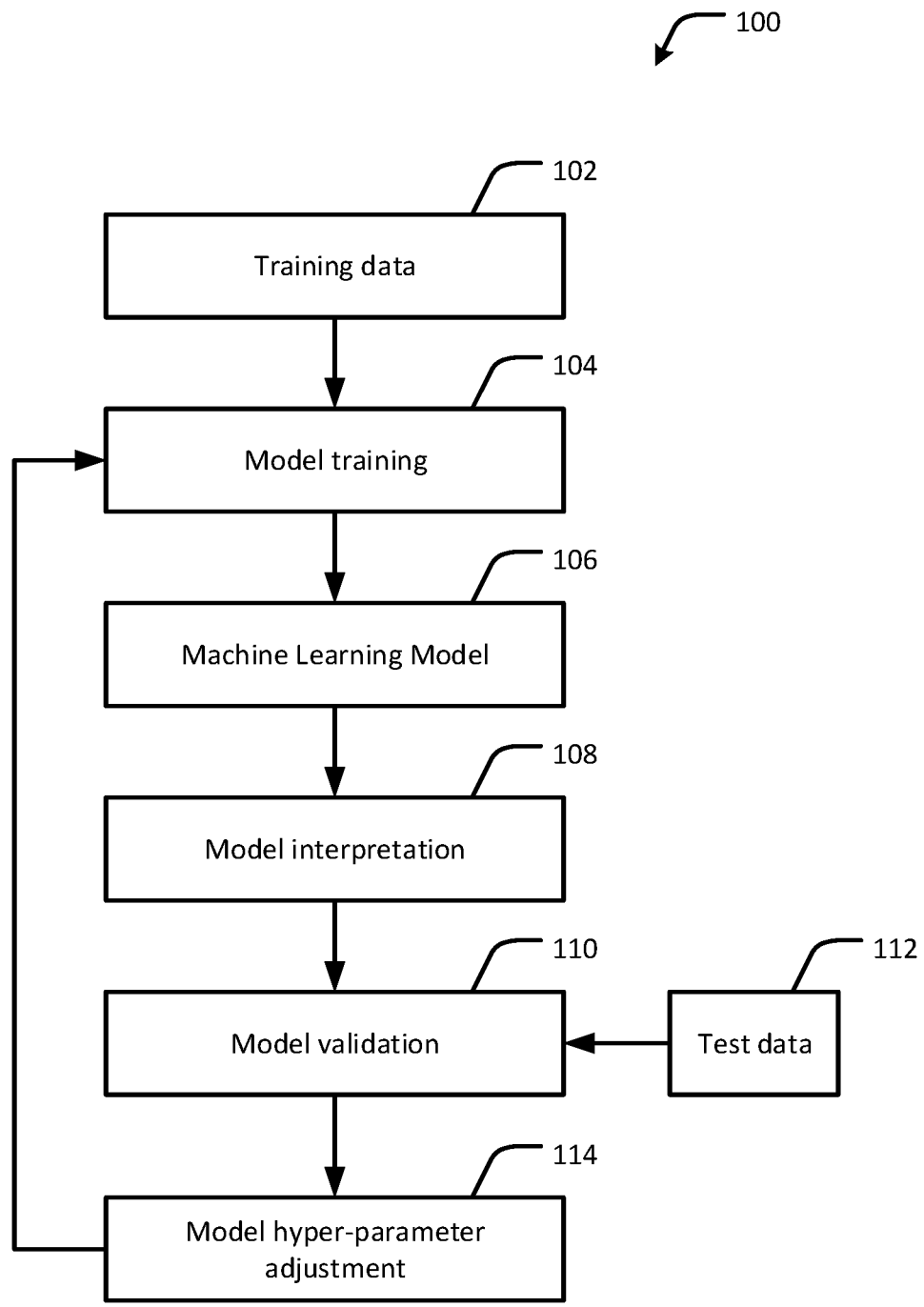
FIG. 1 shows an example workflow for a machine learning model development process, in accordance with an embodiment of the present disclosure.

As noted above, interpreting the behavior of a black box machine learning model is useful for understanding how well the model performs (for example, to confirm that the model is correctly classifying data). Model interpretation is also useful for understanding how the machine learning model behaves globally, because such understanding provides deep insight into both the data on which the model was trained and the generalization power of the rules the model has learned. To this end, techniques are provided herein for generating a set of rules from a set of instance level conditions, where the rules describe the behavior of a given machine learning model at a global level, such as a model that has been used to solve a classification problem. Collectively, the rules represent a pattern followed by the given machine learning model and are useful for gaining insight into its behavior. The techniques are model agnostic, and explain model behavior in a relatively easy to understand manner by outputting a set of rules that can be readily parsed. Although the techniques can be applied to any number of applications, in some embodiments, the techniques are suitable for interpreting models that perform the task of classification. Other machine learning model applications can equally benefit, as will be appreciated.

So, for instance, and according to one specific example embodiment, a system is programmed or otherwise configured to learn rules that explain the behavior of a classification model. Each rule is independent, and is of the form, for example, "If C1 AND C2 AND . . . Then Predict class K." Here, Ci refers to a specific condition such as "18<age<25" and K is some class in the data, such as a classification of "young adult." As will be appreciated in light of this disclosure, the techniques provided herein are illustrated in the context of classification models, but can be extended to other models as well.

Example use cases are instructive as to how the techniques provided herein can be advantageously employed. In one example use case, for instance, assume a given machine learning model is used to predict the risk of loan defaulting by prospective borrowers. An example rule that explains the behavior of the model can be, for instance, of the form "If borrower annual income is less than $20,000 and borrower is married, then default is likely." Knowing this rule is helpful for a number of reasons. First, it allows the developer or analyst (generalized to "developer" going forward) to ascertain and subsequently reject any spurious or incidental patterns in the training data that the model may have picked up on. Second, knowing this rule allows the developer to gain insights about the particular problem domain. For example, in the case of loan rejection, by training a complex model on say the last five years of loan rejection data, and by extracting rules from this model using the techniques provided herein, the developer could gain deep insight into patterns in the original data set. The developer may learn for example the role that implicit bias plays in loan rejection, by examining rules related to certain geo-locations. Another example use case is related to machine learning applications in medicine. In such cases, the techniques provided herein can be used to extract rules that represent the behavior of the model. Such rules would assist the physician in both diagnosing the generalizability of the machine learning model and drawing insights regarding the patterns of past diagnoses. Another example use case is related to data scientists and machine learning developers. In such cases, the techniques provided herein provide a debugging tool. The output of rules explains the behavior of the given model and allows the developer to examine the quality and applicability of the learned rules and take appropriate action. Example appropriate actions that might be taken, for instance, include re-training the model (assuming the output rules indicate that the model was trained on the wrong type of data), or deploying the model (assuming the output rules indicate that the model is on-point with the developers' goals).

Thus, in accordance with an embodiment of the present disclosure, techniques are provided for interpreting a machine learning model into a set of rules that describe the behavior of the model. For example, if the model is a classification model, the rules can collectively describe how the model classifies various inputs to the model. A computer-implemented method includes receiving data representing a machine learning model (which has already been trained), a set of training data, and a set of output classes for classifying a plurality of instances of the training data. Each instance represents at least one feature of the training data. A feature represents a variable or value for a given instance of the data. The method further includes generating a set of instance level conditions by applying each instance and at least one perturbation of the respective instance to the machine learning model and calculating, based on an output of the machine learning model, a marginal contribution of each feature of the respective instance to at least one of tire output classes. Each instance level condition represents a range of values for each feature having a greatest marginal contribution to the output class. The method further includes generating a set of class level rules (also referred to herein as "rules") by applying the instance level conditions for each of the corresponding instances to a genetic algorithm. Each class level rule represents a logical conditional statement that, when the statement hold s true for one or more instances of a particular class, predicts that the respective instances are members of the particular class. At least a portion of the set of class level rules can be displayed to a user or stored in a file for subsequent retrieval and used to interpret the model. Numerous configurations and variations will be apparent in light of this disclosure.

Example Workflow

FIG. 1 shows an example workflow 100 for a machine learning model development process, in accordance with an embodiment of the present disclosure. A machine learning model 106 is trained 104 from a set of training data 102 that represents inputs to the model and expected outputs from the model. For example, the inputs may represent values, or sets of values, that are members of various classes represented by the outputs. After the model 106 has been trained, a data scientist can validate 110 the model 106 for accuracy by applying a set of test data 112 to the model 106 and comparing the outputs predicted by the model 106 against the results expected by the data scientist. Accuracy of the model can be improved by repeatedly adjusting 114 a set of model hyper-parameters, retraining the model, and revalidating the model until it is sufficiently accurate.

The machine learning model development process 100 described above can be augmented by validating the model not only using the test data 112 but also by interpreting 108 the transfer characteristics of the model into a set of rules that explain the behavior of the model. The transfer characteristics of a model define a relationship between the inputs and outputs of the model. For example, the transfer characteristics of a machine learning model can be represented by a logical conditional statement, also referred to as a rule, such as "if condition A is true and condition B is true then the model predicts that the input combination of condition A and condition B is classified in class C." Model interpretation helps provide answers to questions such as "Do I understand my model?", "Is my model performing as intended?", and "Do I trust my model?" The rules can be analyzed by the data scientist to further understand the data on which the model was trained (in the form of patterns the model discovered) as well as the model itself. Further, the data scientist can identify spurious patterns that are not expected to be included in the model. Also, the model interpretation can be used to enrich the training data or to adjust the model hyper-parameters before training the next iteration of the model. For instance, if the model is a neural network and the model has only learned overly specific patterns, then the data scientist can attempt to reduce either the number of hidden layers of the model or the number of nodes per hidden layer to force the model to learn more generic patterns in the training data.

However, the transfer characteristics of machine learning models are inherently invisible and therefore not readily interpretable. This is especially true for more complex models such as neural networks, random forests, and gradient boosted trees. Unfortunately, the complexity of machine learning algorithms that enables them to perform well also makes their inner workings relatively more difficult to understand. A common approach for increasing the interpretability of machine learning models is to use simpler models, such as linear regression, logistic regression, and decision trees, which are more easily interpretable but less accurate. For instance, by looking at the weights learned by a Linear Regression model, it is, possible to determine the relative importance of different features used by the model. Decisions made by such models are relatively easier to justify. However, it is not always possible to use lower accuracy models in production. Hence, there is a trade-off between model accuracy and model interpretability.

More complex, and hence less interpretable, models are needed to increase accuracy and also to represent highly non-linear functions. Most popular among these are, as mentioned above, neural networks, random forests, gradient boosted trees, and so on. A key characteristic of these approaches is that they are able to model very complex patterns and hence achieve higher accuracy on most data sets than their simpler counterparts. However, the cost of this gain in accuracy is model interpretability.

Some existing model interpretation techniques attempt to explain model behavior locally at the instance level. As used in this disclosure, the term "instance level" refers to a subset of training data such as a single row of data in a table containing several rows of data, where each row represents a different record and at least one feature of the training data. For a particular instance, these techniques provide an explanation as to why that instance was classified in a particular class. However, a local interpretation of a model is of limited use in understanding what the model has learned across the entire training data set, and the model needs to be tested across several instances to gain a better interpretation of the model as a whole.

Yet another existing approach to model interpretation includes training surrogate models. In this approach, a decision tree is learned using the training data for the model, where instead of predicting the true classification of the data, the decision tree is trained to predict the classification that is predicted by the model itself. Then, the paths of the tree are output in the form of rules that the model used in making the predictions. However, surrogate models, such as decision trees, have a single root node, and hence all rules extracted from such trees by definition include the root node attribute in their description. Further, even on a relatively simple data set decision trees can become complex with paths that span several features. This can lead to rules that have a large number of unintelligible feature value pairs.

In accordance with an embodiment of the present disclosure, techniques are provided for interpreting a machine learning model into a set of rules that explain the behavior of the model, particularly for classification models. The interpretation techniques generate a set of rules at the global level of the model to explain the behavior of the model from local instance explanations. An advantage of analyzing global behavior is that it helps unearth patterns in the training data that the model used for making classifications. For example, one such pattern may include "males from California having an income above $100,000 were always granted loans." This is in contrast to existing approaches, which are restricted to local instance level explanations and are only useful in interpreting why a model classifies a particular instance into a class.

System Architecture

Figure 2:
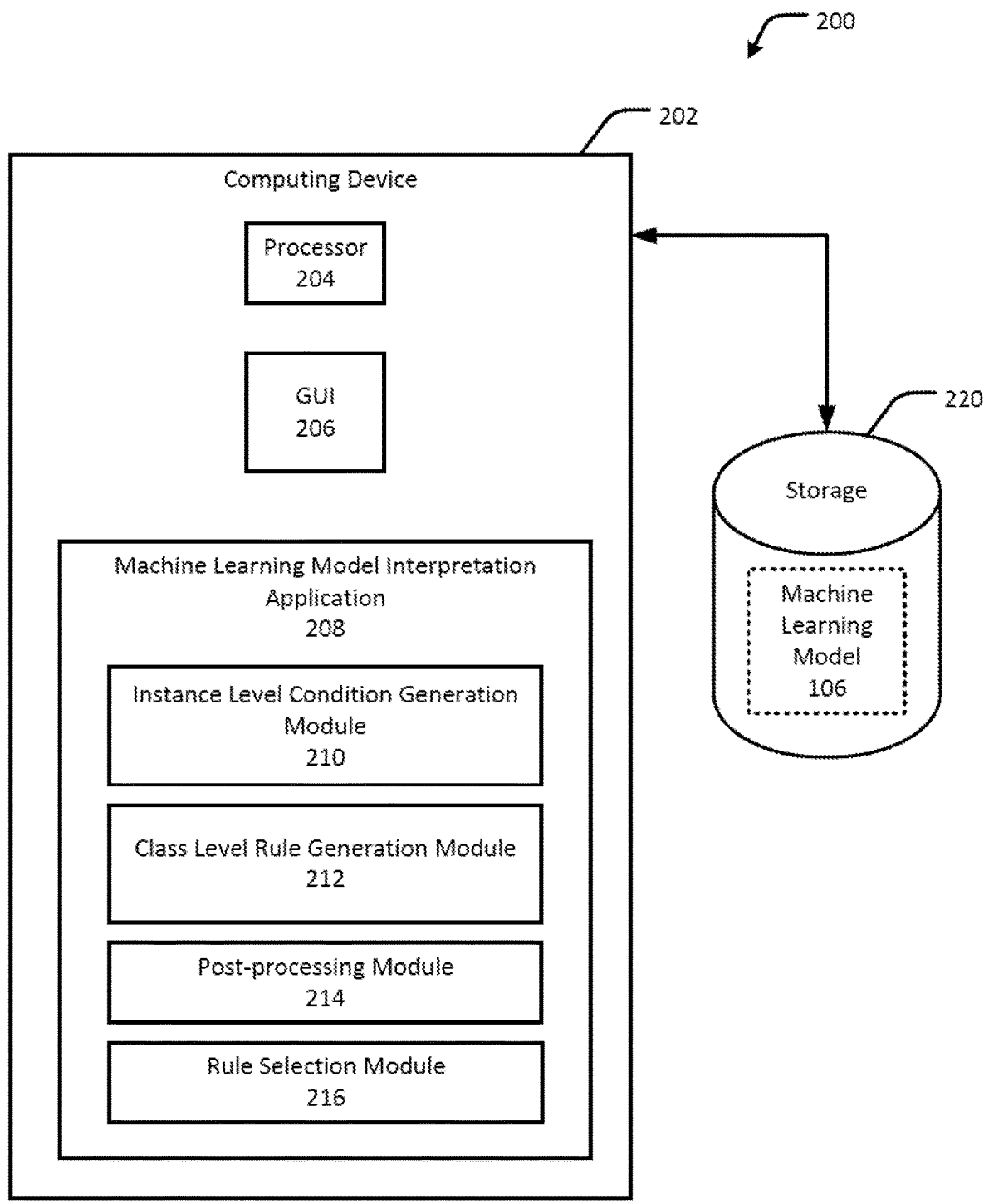
FIG. 2 shows an example system for machine learning model interpretation, in accordance with an embodiment of the present disclosure.

FIG. 2 shows an example system 200 liar machine learning model interpretation, in accordance with an embodiment of the present disclosure. The system 200 includes a computing device 202 having a processor 204, a GUI 206, and a machine learning model interpretation application 208. The computing device 292 is configured to execute the application 208, which includes an instance level condition generation module 210, a class level rule generation module 212, a post-processing module 214, a rule selection module 216, or any combination of these. The computing device 202 is further configured to receive data representing the machine learning model 106 from a storage 220, which includes a database or other suitable data storage device. In some embodiments, the storage 220 is implemented on a back-end server that is remote from the computing device 202 and in communication with the computing device 202 over a network, such as the Internet or an intranet. The storage 220 can include any suitable digital storage device configured to store digitally encoded data. In some embodiments, the data stored on the storage 220 further includes training data, test data, production data, classification data, and other information related to the structure and use of the machine learning model 106.

As will be described in further detail below, the system 200 is configured to interpret the transfer characteristics of the machine learning model 106 into a set of rules that explain the behavior of the model and can be used to validate the model. Briefly, in overview, the instance level condition generation module 210 is configured to generate a set of instance level conditions using the model 106, training data and output classification data. The class level rule generation module 212 is configured to generate, from the instance level conditions, a set of class level rules that describe the behavior of the model 106. The class level rules are generally in the form of logical conditional statements (e.g., if-then statements) that explain how the model classifies input data. The post-processing module 214 is configured to remove redundant rules from the set of rules generated by the class level rule generation module 212. The rule selection module 216 is configured to select a subset of the rules generated by the class level rule generation module 212, so as to provide the most concise, accurate and complete set of rules that sufficiently interprets the model 106.

Example Use Case

The machine learning model interpretation techniques described in this disclosure can be implemented, in whole or in part, on the system 200 of FIG. 2. The interpretation techniques are model agnostic and can be used in conjunction with any set of training data during the machine learning model development process 100 of FIG. 1. A model agnostic approach does not leverage underlying details of the machine learning model in constructing explanations. Rather, the model is treated as a black box and interpretation depends on the predictive function (e.g., classification) of the model. This allows interpretation of the behavior of highly complex ensembles of several personalized algorithms. In this manner, a data scientist can focus on building ensembles that maximize accuracy while not compromising interpretability. This is in contrast to existing approaches that leverage the internal structural properties of the type of algorithm used to train the model, and are therefore restricted to certain, non-generic kinds of models.

The machine learning model interpretation techniques described in this disclosure provide a powerful way to analyze and visualize high dimensional data sets. By training a model on such data sets with a specific objective and interpreting the model using these interpretation techniques, patterns in the model that were extracted from the data can be gleaned. If the model accuracy is high, this helps the data scientist understand what patterns existed in the original data as well as understand the behavior of the model itself.

As previously explained, each class level rule is independent, and can generally be of the form "IF C1 AND C2 AND . . . THEN Predict class K." Ci refers to a specific condition, such as "15<age<25", and K is some class in the data. The techniques disclosed herein can be used with classification models and also extended to regression models (for example, by using binning methods).

A machine learning model developer can read through the rules generated by the disclosed model interpretation techniques. This allows the developer to ascertain and subsequently reject any spurious or incidental patterns in the training data that the model may have picked up on. The developer can also gain insights about the particular problem domain. Continuing the loan grant example above, by training a complex model on the last five years of loan rejection data, and by extracting rules from this model using the interpretation techniques, the developer can gain insight into patterns in his original data set that are not otherwise apparent. For example, the rules may show the role that implicit bias plays in loan rejection, by examining rules related to certain geo-locations. This allows the developer to examine the quality and applicability of the learned rules and take appropriate action.

Machine Learning Model Interpretation

Figure 3:
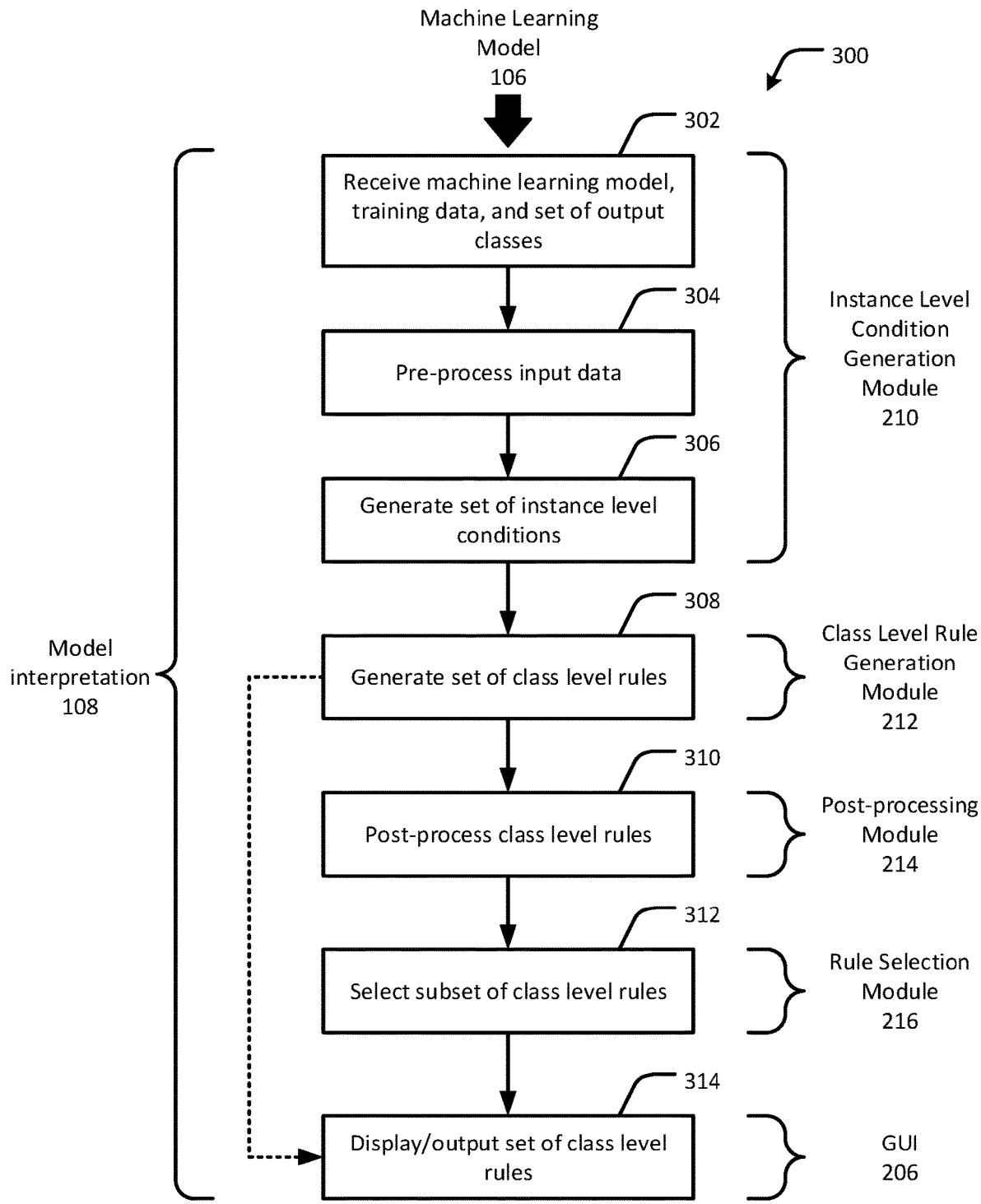
FIG. 3 shows an example method for interpreting a machine learning model, in accordance with an embodiment of the present disclosure.

FIG. 3 shows an example method 300 for interpreting a machine learning model, in accordance with an embodiment of the present disclosure. The method 300 can be implemented, for example, in the system 200 by the machine learning model interpretation application 208 of FIG. 2, and its various processing modules 210, 212, 214 and 216. An example algorithm for interpreting a machine learning model is shown as Algorithm 1 in FIG. 5.

The method 300 receives 302 as inputs one or more sets of data, a machine learning model that has been trained on the data set(s) and a set of output classes for classifying instances in the data. The data set can include training data, test data, or both. In some embodiments, the model can be a classifier, where nothing is initially known about the model implementation. The model has an initially unknown predict-proba($x_i$) function that takes an instance of the data as the input and returns a vector of probabilities. Each element in the vector represents the probability that the instance belongs to a particular class. The class selected by the classifier for an instance is generally, but not necessarily, the class corresponding to the highest probability in the vector.

Pre-Processing Input Data

The interpretation method 300 pre-processes 304 the input data to make each feature categorical. Features that are already categorical are not modified. Numerical features are converted into categorical features using entropy based binning techniques or, alternatively, Minimum Description Length Principle (MDLP) (Ramírez-Gallego Sergio et al., "Data discretization: taxonomy and big data challenge," WIREs Data Mining Knowl Discov 2016, 6: 5-21. doi: 10.1002/widm.1173). For example, if the attribute age takes values from 10 to 85 (inclusive), then the age data may be binned into the categorical ranges "10≤age<25", "25≤age<60", and "60≤age≤85". After pre-processing the input data, the input data includes only categorical features.

Generate Instance Level Conditions

Next, a set of instance level conditions is generated 306 by iterating over each instance in the input data. An example algorithm for generating 306 instance level conditions is shown as Algorithm 2 in FIG. 6. Each instance is classified by the model into a particular class. The marginal contribution of each categorical feature to the classification is computed. For example assume a instance of the training data has three features: age, income, and state. The features for a particular instance have been categorized or binned as "10≤age<25", "100≤income<200", and "state=New York". The output of the classifier for this instance is the probability that the instance is in a particular class. For example, the output may be (0.69, 0.31), which means that there is a 69% chance that the instance is in class 1, and a 31%, chance that the instance is in class 2. Since this is a classification problem, the instance is classified as class 1 because the probability is highest for that class.

If the true Shapley values for each feature were computed for each feature in reaching this classification, then the process would be computationally expensive. Instead, a given instance of the input data is perturbed (i.e., the input data is varied), and a locally faithful linear model is trained in the locality of the instance. The weights (probabilities) of the different features then approximate the marginal contribution values. An optimization to speed up computation can be performed by excluding all instances in the input data that are already covered by the conditions obtained from a particular instance of the training data. In other words, the algorithm can consider instances of the data that are not yet covered by one of the conditions generated from the training data. Each condition includes a single feature, and a value for categorical features or a range of values for numerical features. The result after considering all instances is an exhaustive list of conditions that were important at each instance level, including subsets of the conditions that were important in classifying instances of that class.

Generating Class Level Rules

Next, a set of class level rules is generated 308 for a given subset of conditions associated with classifying instances of a particular class. Each rule interprets the model 106 with respect to each class and is generated at the class level by applying the instance level conditions for each of the corresponding instances to a genetic algorithm (e.g., a meta-heuristic), as will be understood by one of skill in the art. The genetic algorithm generates the set of rules using the class level conditions and each of the corresponding instances (the solution domain), and further using a fitness score that is calculated for each rule.

A rule R is defined as logical conditional statement (i.e., an if-then statement) that, when the statement holds true for one or more instances of the class, predicts that the respective instances are members of a particular class. The rule can, for example, be represented in the form of "IF condition1 AND condition2 . . . THEN Predict class n". For example, if "10≤age<25" and "100≤income<200" are conditions for class 2, then a candidate rule for the class is "IF 10≤age<25 AND 100≤income<200 THEN Predict Class 2". If the data includes categorical variables, the rules allow these categorical variables to take more than one value. For example, if there is a categorical variable called country and if "10≤age<25", "country=US", and "country=India" are conditions for class 2, then a candidate rule can be "If 10≤age<25 AND (country=US OR country=India) THEN Predict Class 2". Therefore, conditions in the rule can, be combined using logical AND, logical OR, or a combination of both for conditions involving a categorical variable so that the variable can take on multiple alternative values. FIG. 4 is an example table providing additional descriptions and examples of certain terms used in this disclosure.

According to an embodiment, each rule predicts a class (out of several or classes). There can be some training data records (or rows or instances) that satisfy the conditions of the rule. All of those instances need not be associated with the same class as predicted by that rule. For example: Total records matching the rule=A. Out of these rules (A), the number of instances for which the model predicts the same class as the rule=B. Let the total number of instances (regardless of any rule) that model associates with that class=C. Then, the precision of the rule=B/A (i.e., a measure of how accurately the rule predicts the class associated with it). The coverage of the rule=B/C (i.e., a measure of how many instances of that class are covered under the rule). The denominator of the coverage is not number of instances in the whole data-set, but the ones that the model predicts the same class (associated with the rule).

A measure of how well a particular rule R accurately and completely interprets the model can be qualified by its precision and coverage. The precision of rule R is the ratio of the number of instances that are correctly covered by the rule (that is, the number of instances where the rule correctly predicted the class) to the number of instances that are covered by the rule (that is, the total number of instances where the rule predicted any class, whether or not those predictions were correct). Thus, the precision of rule R represents the accuracy of the rule gleaned from the model and the data (e.g., a precision of 70% means that the rule correctly predicts 70% of the instances). The coverage of rule R is the ratio of the number of instances that are correctly covered by the rule to the number of instances in the training data that have been predicted by the classifier model to be members of class C. Thus, the coverage of rule R represents the relative number of instances that the rule interprets or explains (e.g., a coverage of 23% means that the rule only covers or represents 23% of the instances). The higher the precision and coverage of a rule, the more likely the rule accurately and completely interprets and explains the model.

To obtain the most optimal set of rules, the fitness score of each rule is evaluated based on the precision and coverage of the rule, either or both of which can be optionally weighted to give more importance to one factor over another. For example, the fitness score of a given rule R is a function of the harmonic mean of the precision and coverage of the rule:

$$\text{Fitness}(R) = \frac{2 \times \text{Precision}(R) \times \text{Coverage}(R)}{\text{Precision}(R) + \text{Coverage}(R)}.$$

In some embodiments, the fitness of a given rule can be evaluated on other factors, such as the length and complexity of the rule (shorter rules are easier to interpret) and the degree to which an instance is covered by conflicting rules that predict different classes for the same instance. Any factor can be optionally weighted. For example, if, the number of conditions generated in the previous step (generating instance level conditions 306) was 100, then each individual of a population is a bit string of length 100. One example string is "100100000 . . . 000", where each bit represents the presence or absence of one of the 100 conditions (in this example, conditions 1 and 4 are present). The population may include, for example, 1200 individuals with a cross-over probability of 50% and a mutation probability set in such a manner that only two bits of an individual are flipped while undergoing mutation in the genetic algorithm. This provides a reasonable trade-off between exploration and exploitation.

The population can be initialized with individuals that have a high probability of being "fit." These are individuals with only one bit set in the bit string (such as, 1000, 0100, 0010 and 0001), followed by those with only two bits set (1100, 0110, 0101 . . . ) and so on and so forth until the entire population size, e.g., 1200 individuals, is reached. The genetic algorithm can be run for 600 generations, in one non-limiting example. All the individuals of the last generation are finally selected as the rule set for one class. Hence, the output of this step is an exhaustive rule set for each class. The set of rules can be displayed to a user or otherwise output as a file, such as a comma separated value (CSV) file, or in another suitable format, such as JSON, XML, etc. In some cases, there may be one or more rules that do not add value to the set (for example, redundant or cumulative rules) and can be filtered out in post-processing.

In an embodiment, it is possible to derive rule fitness based on mutual information (MI) instead of using the fitness score described above (i.e., the harmonic mean of precision and coverage). The MI of two random variables is a measure of the mutual dependence between the two variables. More specifically, it quantifies the amount of information (in units such as shannons, more commonly called bits) obtained about one random variable, through the other random variable. The concept of mutual information is intricately linked to that of entropy of a random variable, a fundamental notion in information theory, that defines the amount of information held in a random variable. The MI of two discrete random variables X and Y ran be defined as:

$$I(X;Y) = \sum_{y \in Y} \sum_{x \in X} P(x,y) \log\left(\frac{p(x,y)}{p(x)p(y)}\right)$$

where p(x,y) is the joint probability function of X and Y, and p(x) and p(y) are the marginal probability distribution functions of X and Y, respectively.

The MI between the rule and the predicted class can be shown by example where a contingency table has two rows Rule and not Rule) and two columns (e.g., Class, not Class). For example, assume there are four classes A, B, C and D, and the rule is "IF State=California AND Age>30 THEN Predict class B." Then a sample MI table may look like (where the table values represent the MI between the rude and the predicted class):

| Rule | Class B | Classes A, C, D |
|---|---|---|
| State = California and Age > 30 | 300 | 400 |
| State != California and Age <= 30 | 2000 | 10000 |

Post-Processing Rules

The rules generated in the previous step may include several, redundant rules. The method 300 further includes post-processing 310 the rules by sorting the rules in descending order of precision. Then, for each rule, the rule is checked for being in a subset of an already added, more precise rule. By subset, it will be understood to mean that $R_2$ is a subset of $R_1$ if every instance correctly covered by $R_2$ is also correctly covered by $R_1$. If it is a subset of a more precise rule, then this rule is not considered for the next step. Otherwise, this rule is retained for consideration.

Selection of Rules to Describe Each Class

Next, a subset of the class level rules is selected 312 for each class that describes the model behavior for that class. Although all rules can be considered, in some circumstances multiple rules collectively explain instances that are also explained by another, single rule, which may be easier to understand than several different rules in combination. Since any set has $2^N$ subsets, selecting the subset of rules is an NP-hard problem.

There are several possible approaches for selecting 312 the subset of rules. One approach is a greedy approach that maximizes the coverage of the subset of rules. An example algorithm for selecting 312 the subset of rules using the greedy approach is shown as Algorithm 3 in FIG. 7. The input to the algorithm is a coverage threshold and the class level rules. For example, the coverage threshold may be set at 90% if high coverage is desired. Then, for each class, the algorithm sorts the rules in descending order of precision. Next, each rule is added to the set of final rules until a subset of the set of class level rules that predict that at least coverage threshold of the respective instances are members of a particular class is obtained. The advantage of this approach is that it provides high data set coverage.

Another approach for selecting 312 the subset of rules is a dynamic programing based approach that maximizes the fitness score of the rule set. An example algorithm for selecting 312 the subset of rules using the dynamic programming based approach is shown as Algorithm 4 in FIG. 8. The input to the algorithm is the set of class level rules. For each class, the fitness score is computed for two subsets, one that contains a new rule and one that does not, and retaining the rule with the higher fitness score in the set while discarding the other from the set.

Yet another approach for selecting 312 the subset of rules is to use a second level genetic algorithm. For each class, each individual of the population is a bit string, having a length equal to the number of rules. For example, the individual "1100000 . . . 00" corresponds to a rule set that includes only $R_1$ and $R_2$ and covers all instances that are covered by $R_1$ or $R_2$. The rule set is an "OR" across several rules based on the fitness scores.

Sorting Rules by Fitness Score

Once a subset of rules is selected for a class, the rules are sorted according to the fitness score, so that the most relevant rules are at the top of the list and less relevant ones are further down the list. First, the rule with the highest fitness score is added to the top of the list. Then, the algorithm iterates over all remaining rules, and adds the rule which increases the fitness score of the rule set by the highest amount until all rules have been added. The resulting subset of class level rules can then be displayed or output 314 to a user. For example, the rules can be displayed via the GUI 206 of FIG. 2 or stored in a data file such as a CSV file for subsequent retrieval by the user.

Computing Device

Figure 9:
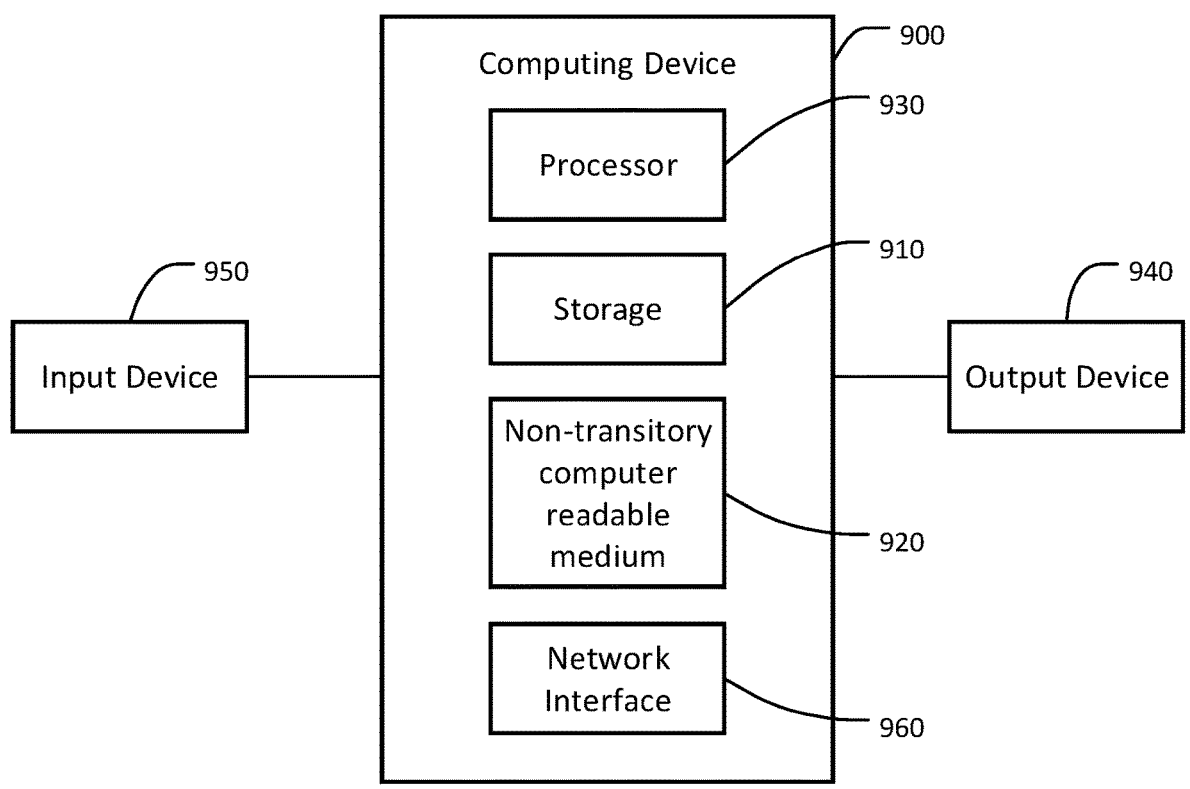
FIG. 9 is a block diagram representing an example computing device that may be used to perform any of the techniques as variously described in this disclosure.

FIG. 9 is a block diagram representing an example computing device 900 that may be used to perform any of the techniques as variously described in this disclosure. For example, the system 200 of FIG. 2, or any portions thereof, and the method 300 of FIG. 3, or any portions thereof, may be implemented in the computing device 900. The computing device 900 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 900 includes one or more storage devices 910 or non-transitory computer-readable media 920 having encoded thereon one or more computer-executable instructions or software for implementing techniques as variously described in this disclosure. The storage devices 910 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 910 may include other types of memory as well, or combinations thereof. The storage device 910 may be provided on the computing device 900 or provided separately or remotely from the computing device 900. The non-transitory computer-readable media 920 may include, but are not limited to, one or more types of hardware memory, non-transitory tangible media (for example, one or more magnetic storage disks, one or more optical disks, one or more USB flash drives), and the like. The non-transitory computer-readable media 920 included in the computing device 900 may store computer-readable and computer-executable instructions or software for implementing various embodiments. The computer-readable media 920 may be provided on the computing device 900 or provided separately or remotely from the computing device 900.

The computing device 900 also includes at least one processor 930 for executing computer-readable and computer-executable instructions or software stored in the storage device 910 or non-transitory computer-readable media 920 and other programs for controlling system hardware. Virtualization may be employed in the computing device 900 so that infrastructure and resources in the computing device 900 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 900 through an output vice 940, such as a screen or monitor, which may display one or more user interfaces provided in accordance with some embodiments. The output device 940 may also display other aspects, elements or information or data associated with some embodiments. The computing device 900 may include other input devices 950 for receiving input from a user, for example, a keyboard, a joystick, a game controller, a pointing device (e.g., a mouse, a user's finger interfacing directly with a touch-sensitive display device, etc.), or any suitable user interface, including a VR headset. The computing device 900 may include other suitable conventional 110 peripherals and a network interface 960 for communicating with other devices via a communication network (not shown). The computing device 900 includes or is operatively coupled to various suitable devices for performing one or more of the aspects as variously described in this disclosure.

The computing device 900 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 900 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as a computing device 202, the processor 204, the GUI 206, the machine learning model interpretation application 208, or any combination of these, is implemented software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 900, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse touch pad, touch screen, etc.), and operating system, are not shown but will be readily apparent.

Numerous embodiments will be apparent in light of the present disclosure, and features described herein can be combined in any number of configurations. One example embodiment includes a computer-implemented method of interpreting a machine learning model. The method includes receiving, by a processor-based system, data representing a machine learning model, a set of training data, and a set of output classes for classifying a plurality of instances of the training data, each instance representing at least one feature of the training data. The method further includes generating, by the processor-based system, a set of instance level conditions by applying each instance and at least one perturbation of the respective instance to the machine learning model and calculating, based on an output of the machine learning model, a contribution of each feature of the respective instance to at least one of the output classes, wherein each instance level condition represents a range of values for each feature having a greatest contribution to the output class. The method further includes generating, by the processor-based system, a set of class level rules by applying the instance level conditions for each of the corresponding instances to a genetic algorithm, each class level rule representing a logical conditional statement that, when the statement holds true for one or more instances of a particular class, predicts that the respective instances are members of the particular class; and causing, by the processor-based system, a display at least a portion of the set of class level rules to a user. In some cases, generating the set of class level rules includes calculating, by the processor-based system, at least one of a fitness score for each class level rule based on a harmonic mean of precision of the respective class level rule and a coverage of the respective class level rule, and a mutual information between the respective class rule and the predicted class, wherein the genetic algorithm is configured to generate the set of class level rules using at least one of the fitness score and the mutual information. In some cases, the method includes sorting, by the processor-based system, the set of class level rules according to at least one of the fitness score and the mutual information corresponding to each of the class level rules. In some cases, at least one of the features is a numerical feature, and the method further includes pre-processing, by the processor-based system, the set of training data to convert the numerical feature into a categorical feature using entropy based binning. In some cases, the method includes selecting, by the processor-based system, a subset of the set of class level rules that predict that at least a threshold percentage of the respective instances are members of a particular class. In some cases, the method includes selecting, by the processor-based system, a subset of the set of class level rules by calculating at least one of a fitness score for each of a pair of the class level rules based on a harmonic mean of a precision of the respective class level rule and a coverage of the respective class level rule, and a mutual information between the respective class rule and the predicted class, and selecting the class level rule having a greatest fitness score from the pair of class level rules using at least one of the fitness score and the mutual information. In some cases, the method includes selecting, by the processor-based system, a subset of the set of class level rules by applying each of a pair of the class level rules to a second level genetic algorithm, where generating the set of class level rules includes calculating at least one of a fitness score for each class level rule based on a harmonic mean of a precision of the respective class level rule and a coverage of the respective class level rule, and a mutual information between the respective class rule and the predicted class, and where the second level genetic algorithm is configured to select the subset of class level rules using at least one of the fitness score and the predicted class. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of interpreting a machine learning model, the method comprising:

receiving, by a processor-based system, a set of training data and a set of output classes for classifying a plurality of instances of the set of training data, each instance representing at least one feature of the set of training data;

applying, by the processor-based system, each instance and at least one perturbation of the respective instance to the machine learning model having a function that takes each instance and each perturbation of the respective instance to obtain, from an output of the machine learning model, a probability that each feature of the respective instance belongs to each of the output classes;

classifying, by the processor-based system, each instance into one of the output classes for which the probability that each feature of the respective instance belongs to the respective output class is highest;

producing, for each respective instance, a set of instance level conditions each representing a presence or absence of each feature of the respective instance in the output class where the instance is classified;

applying, by the processor-based system, the instance level conditions for each of the corresponding instances to a genetic algorithm to produce a set of class level rules, each class level rule representing a logical conditional statement that predicts that the respective instances are members of a particular output class, wherein producing the set of class level rules further comprises calculating a fitness score for each class level rule based on (a) a harmonic mean of a precision of the respective class level rule and a coverage of the respective class level rule, (b) a rule length for the respective class level rule, and (c) a conflict metric that represents a degree to which two of the class level rules predict different classes for a single instance;

filtering the set of class level rules to produce a filtered set of class level rules by removing, from the set of class level rules, a redundant class level rule, wherein every instance correctly covered by the removed redundant class level rule is also correctly covered by a different class level rule in the filtered set of class level rules;

selecting a subset of the filtered set of class level rules by applying each of a pair of the class level rules in the filtered set to a second level genetic algorithm that is configured to select the subset using the fitness score; and using the subset to update the set of training data and retrain the machine learning model using the updated set of training data, wherein retraining the machine learning model further comprises adjusting a set of model hyper-parameters that define at least one of a number of hidden layers of the machine learning model or a number of nodes per hidden layer of the machine learning model.

2. The method of claim 1, wherein at least one generation of the genetic algorithm is configured to produce the set of class level rules using the fitness score.

3. The method of claim 1, further comprising sorting, by the processor-based system, the set of class level rules in descending order of the precision.

4. The method of claim 1, wherein at least one of the features is a numerical feature, and wherein the method further comprises pre-processing, by the processor-based system, the set of training data to convert the numerical feature into a categorical feature using entropy based binning.

5. The method of claim 1, wherein the subset of the filtered set of class level rules predict that at least a threshold percentage of the respective instances are members of the particular output class.

6. The method of claim 1, further comprising selecting a class level rule having a greatest fitness score from the pair of the class level rules using the fitness score.

7. The method of claim 1, wherein adjusting the set of model hyper-parameters comprises reducing the number of hidden layers of the machine learning model.

8. A computer program product including one or more non-transitory computer readable mediums having instructions encoded thereon that when executed by one or more computer processors cause the one or more computer processors to perform a process for interpreting a machine learning model, the process including receiving a set of training data and a set of output classes for classifying a plurality of instances of the set of training data, each instance representing at least one feature of the set of training data;

applying each instance and at least one perturbation of the respective instance to the machine learning model having a function that takes each instance and each perturbation of the respective instance to obtain, from an output of the machine learning model, a probability that each feature of the respective instance belongs to each of the output classes;

classifying each instance into one of the output classes for which the probability that each feature of the respective instance belongs to the respective output class is highest;

producing, for each respective instance, a set of instance level conditions each representing a presence or absence of each feature of the respective instance in the output class where the instance is classified;

applying the instance level conditions for each of the corresponding instances to a genetic algorithm to produce a set of class level rules, each class level rule representing a logical conditional statement that predicts that the respective instances are members of a particular output class, wherein producing the set of class level rules further comprises calculating a fitness score for each class level rule based on (a) a harmonic mean of a precision of the respective class level rule and a coverage of the respective class level rule, (b) a rule length for the respective class level rule, and (c) a conflict metric that represents a degree to which two of the class level rules predict different classes for a single instance;

filtering the set of class level rules to produce a filtered set of class level rules by removing, from the set of class level rules, a redundant class level rule, wherein every instance correctly covered by the removed redundant class level rule is also correctly covered by a different class level rule in the filtered set of class level rules;

selecting a subset of the filtered set of class level rules by applying each of a pair of the class level rules in the filtered set to a second level genetic algorithm that is configured to select the subset using the fitness score; and using the subset to update the set of training data and retrain the machine learning model using the updated set of training data, wherein retraining the machine learning model further comprises adjusting a set of model hyper-parameters that define at least one of a number of hidden layers of the machine learning model or a number of nodes per hidden layer of the machine learning model.

9. The computer program product of claim 8, wherein at least one generation of the genetic algorithm is configured to produce the set of class level rules using the fitness score.

10. The computer program product of claim 8, wherein the process includes sorting the set of class level rules in descending order of the precision.

11. The computer program product of claim 8, wherein at least one of the features is a numerical feature, and wherein the process includes pre-processing the set of training data to convert the numerical feature into a categorical feature using entropy based binning.

12. The computer program product of claim 8, wherein the subset of the filtered set of class level rules predict that at least a threshold percentage of the respective instances are members of the particular output class.

13. The computer program product of claim 8, wherein the process includes selecting a class level rule having a greatest fitness score from the pair of the class level rules using the fitness score.

14. The computer program product of claim 8, wherein adjusting the set of model hyper-parameters comprises reducing the number of hidden layers of the machine learning model.

15. A system for interpreting a machine learning model, the system comprising:

one or more storages; and one or more processors operatively coupled to the one or more storages, the one or more processors configured to execute instructions stored in the one or more storages that when executed cause the one or more processors to carry out a process including receive a set of training data and a set of output classes for classifying a plurality of instances of the set of training data, each instance representing at least one feature of the set of training data;

apply each instance and at least one perturbation of the respective instance to the machine learning model having a function that takes each instance and each perturbation of the respective instance to obtain, from an output of the machine learning model, a probability that each feature of the respective instance belongs to each of the output classes;

classify each instance into one of the output classes for which the probability that each feature of the respective instance belongs to the respective output class is highest;

produce, for each respective instance, a set of instance level conditions each representing a presence or absence of each feature of the respective instance in the output class where the instance is classified;

apply the instance level conditions for each of the corresponding instances to a genetic algorithm to produce a set of class level rules, each class level rule representing a logical conditional statement that predicts that the respective instances are members of a particular output class, wherein producing the set of class level rules further comprises calculating a fitness score for each class level rule based on (a) a harmonic mean of a precision of the respective class level rule and a coverage of the respective class level rule, (b) a rule length for the respective class level rule, and (c) a conflict metric that represents a degree to which two of the class level rules predict different classes for a single instance;

filter the set of class level rules to produce a filtered set of class level rules by removing, from the set of class level rules, a redundant class level rule, wherein every instance correctly covered by the removed redundant class level rule is also correctly covered by a different class level rule in the filtered set of class level rules;

select a subset of the filtered set of class level rules by applying each of a pair of the class level rules in the filtered set to a second level genetic algorithm that is configured to select the subset using the fitness score; and use the subset to update the set of training data and retrain the machine learning model using the updated set of training data, wherein retraining the machine learning model further comprises adjusting a set of model hyper-parameters that define at least one of a number of hidden layers of the machine learning model or a number of nodes per hidden layer of the machine learning model.

16. The system of claim 15, wherein at least one generation of the genetic algorithm is configured to produce the set of class level rules using the fitness score.

17. The system of claim 15, the process further comprising: sort the set of class level rules in descending order of the precision.

18. The system of claim 15, wherein at least one of the features is a numerical feature, the process further comprising: pre-process the set of training data to convert the numerical feature into a categorical feature using entropy based binning.

19. The system of claim 15, wherein the subset of the filtered set of class level rules that predict that at least a threshold percentage of the respective instances are members of the particular output class.

20. The system of claim 15, wherein adjusting the set of model hyper-parameters comprises reducing the number of hidden layers of the machine learning model.

* * * * *